(12) United States Patent
YiSan et al.

(10) Patent No.: US 11,394,689 B2
(45) Date of Patent: *Jul. 19, 2022

(54) APPLICATION BASED NETWORK TRAFFIC MANAGEMENT

(71) Applicant: VMware, Inc., Palo Alto, CA (US)

(72) Inventors: Zhao YiSan, Beijing (CN); Shengbo Teng, Beijing (CN); Nan Wang, Beijing (CN); Tracy Yan Chi, Beijing (CN)

(73) Assignee: VMware, Inc., Palo Alto, CA (US)

( * ) Notice: Subject to any disclaimer, the term of this patent is extended or adjusted under 35 U.S.C. 154(b) by 267 days.

This patent is subject to a terminal disclaimer.

(21) Appl. No.: 16/686,943

(22) Filed: Nov. 18, 2019

(65) Prior Publication Data

US 2020/0084183 A1 Mar. 12, 2020

Related U.S. Application Data

(63) Continuation of application No. 15/367,441, filed on Dec. 2, 2016, now Pat. No. 10,484,332.

(51) Int. Cl.
*H04L 9/40* (2022.01)
*G06F 9/455* (2018.01)

(52) U.S. Cl.
CPC ...... *H04L 63/0236* (2013.01); *G06F 9/45558* (2013.01); *H04L 63/0263* (2013.01); *G06F 2009/45579* (2013.01); *G06F 2009/45587* (2013.01); *G06F 2009/45595* (2013.01)

(58) Field of Classification Search
CPC ............ H04L 63/0236; H04L 63/0263; G06F 9/45558; G06F 2009/45579; G06F 2009/45587; G06F 2009/45595
See application file for complete search history.

(56) References Cited

U.S. PATENT DOCUMENTS

| | | | | |
|---|---|---|---|---|
| 10,484,332 B2* | 11/2019 | YiSan | ................. | H04L 63/0236 |
| 2010/0125712 A1* | 5/2010 | Murase | ............... | G06F 11/1458 |
| | | | | 711/162 |
| 2012/0174096 A1* | 7/2012 | Conover | ............. | G06F 9/45558 |
| | | | | 718/1 |
| 2012/0297311 A1* | 11/2012 | Duggal | ................. | H04L 63/102 |
| | | | | 715/740 |
| 2014/0245423 A1* | 8/2014 | Lee | ..................... | H04L 63/0218 |
| | | | | 726/12 |
| 2016/0028855 A1* | 1/2016 | Goyal | ..................... | H04L 43/10 |
| | | | | 709/203 |
| 2016/0357585 A1* | 12/2016 | Ulatoski | ............ | G06F 9/45558 |
| 2016/0359981 A1* | 12/2016 | Ulatoski | ............ | G06F 9/45558 |
| 2017/0244674 A1* | 8/2017 | Han | .................... | H04L 63/0263 |
| 2018/0183761 A1 | 6/2018 | Gunda et al. | | |

\* cited by examiner

*Primary Examiner* — Matthew Smithers

(57) ABSTRACT

Described herein are systems, methods, and software to enhance network traffic management for virtual machines. In one implementation, a host for a virtual machine may identify applications available for execution on the virtual machine from mounted application volumes and identify firewall rules for the applications. Once identified, the host may identify network traffic for the virtual machine, and forward or block the network traffic for the virtual machine based on the firewall rules.

20 Claims, 8 Drawing Sheets

| APPLICATION IDS 510 | SOURCES 520 | DESTINATIONS 530 | ACTIONS 540 |
|---|---|---|---|
| APPLICATION A 540 | SOURCE | DESTINATION | ACTION |
| APPLICATION B 541 | SOURCE | DESTINATION | ACTION |
| APPLICATION C 542 | SOURCE | DESTINATION | ACTION |
| APPLICATION D 543 | SOURCE | DESTINATION | ACTION |

DATA STRUCTURE 500

FIGURE 5

| USER IDS 710 | APPLICATION 720 | APPLICATION 721 | APPLICATION 722 |
|---|---|---|---|
| USER A 740 | APPLICATION | APPLICATION | APPLICATION |
| USER B 741 | APPLICATION | APPLICATION | |
| USER C 742 | APPLICATION | APPLICATION | |
| ... | ... | ... | ... |
| USER D 743 | APPLICATION | APPLICATION | APPLICATION |

700

APPLICATION BASED NETWORK TRAFFIC MANAGEMENT

RELATED APPLICATIONS

This application is a continuation of U.S. application Ser. No. 15/367,441 entitled "APPLICATION BASED NETWORK TRAFFIC MANAGEMENT" filed Dec. 2, 2016, which is hereby incorporated by reference in their entirety.

BACKGROUND

In virtual desktop environments, host computers may execute a plurality of virtual machines that can be accessed as a service by end users for traditional desktop computing tasks. These users may login to the service via end user devices and, in response to the login, be provided with a virtual machine to accomplish desired tasks. Once the user logs out of the service or the virtual machine, the service may allocate the same virtual machine to a new requesting user.

Although this service model allows multiple users to access virtual machines and the applications available thereon, each of the users may require a different set of applications. For example, an engineer of an organization may require a different set of applications than a financial officer of the same organization. To provide the required applications, the service may identify applications required for a user, and attach application volumes to the virtual machine allocated to the user to make the applications executable from the storage volumes. An application volume may be considered a containerized, or virtualized, application stored in a virtual disk. When the virtual disk is attached to the virtual machine, an agent running on the virtual machine overlays the containerized application on the native file structure so that the containerized application appears to be natively installed onto the disk of the virtual machine. In some implementations, this attachment process may modify any required registry information of the virtual machine to make the applications executable from the application volumes.

Once the application volumes are attached, the user may execute the applications located in the attached volumes as if the applications were locally installed on the virtual machine. However, although applications may be attached via application volumes, it is often difficult to manage the inbound and outbound network traffic associated with the virtual machine. In particular, because different applications may be attached and made available on a virtual machine based on the current user allocated to the virtual machine, it is often difficult to configure firewall and network management resources for the particular applications.

OVERVIEW

The technology disclosed herein enhances network traffic management for virtual machines. In one implementation, a method of implementing a firewall for a virtual machine includes identifying one or more applications available for execution on the virtual machine from one or more mounted application volumes, and identifying firewall rules for the one or more applications. The method further provides identifying outbound network traffic from the virtual machine to a destination network address, determining whether to permit the outbound network traffic based on the firewall rules, and, if permitted, forwarding the outbound network traffic to the destination network address.

BRIEF DESCRIPTION OF THE DRAWINGS

The following description and associated figures teach the best mode of the invention. For the purpose of teaching inventive principles, some conventional aspects of the best mode may be simplified or omitted. The following claims specify the scope of the invention. Note that some aspects of the best mode may not fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by the claims and their equivalents.

FIG. 5 illustrates a data structure to manage firewall rules according to an implementation.

DETAILED DESCRIPTION

Figure 1:
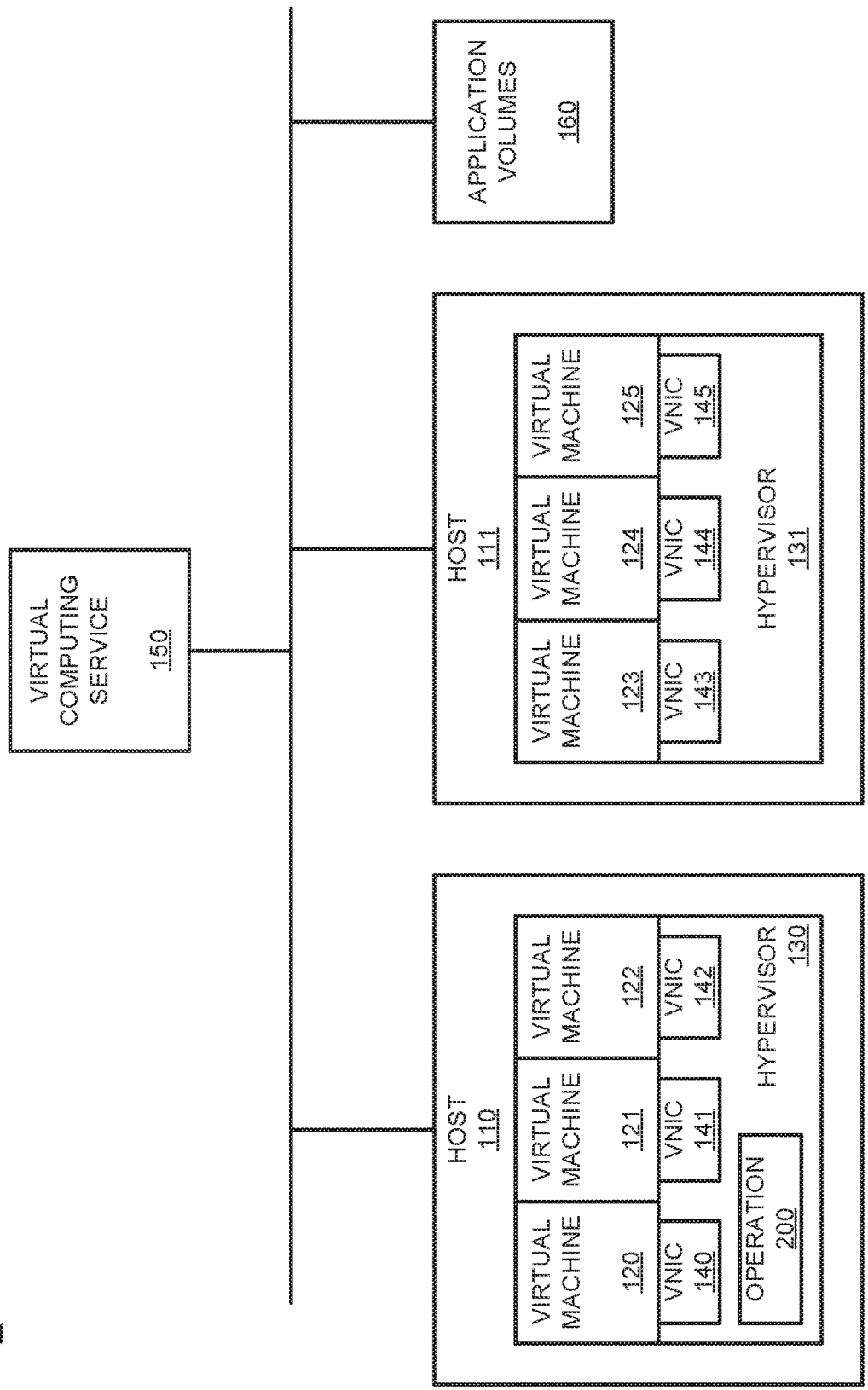
FIG. 1 illustrates a computing environment to implement application based network traffic management according to an implementation.

The various examples disclosed herein provide enhancements for application based network traffic management. In many situations, virtual machines provide a centralized computing platform for one or more end users to access and execute desired applications and operations. To provide each of the end users with the required applications, and prevent access to unnecessary applications, one or more application volumes are made available in the virtual environment that are capable of being attached to the individual virtual machines. These application volumes may include, but are not limited to, virtual machine disks (VMDKs), virtual hard disks (VHDs), or some other virtual disk file capable of storing applications for execution on the virtual machines.

To make the applications available to each individual user, a virtual computing service may be employed that acts as a broker between the end users and the plurality of virtual machines, and further acts as a volume manager that initiates the attachment of application volumes to the individual virtual machines. For example, a user may, via an end user device, initiate a service login to initiate a virtual computing session. This service login may be accomplished using a dedicated application on the end user device, a web browser interface on the end user device, or any other similar interface on the end user device. Responsive to the service login, the virtual computing service may identify an available virtual machine to allocate to the end user, and initiate a user login process to log the end user into the virtual machine. Additionally, the service may identify one or more storage volumes associated with the user and attach the one or more storage volumes to virtual machine. Once attached and the user is logged into the virtual machine, the user may execute any of the applications from the attached storage volumes.

To attach the application volumes to the virtual machine, the virtual computing service may initiate a process to mount the volumes to the allocated virtual machine for the end user, and overlay the contents of the volumes to make the one or more applications within the volumes executable by the virtual machine. In some examples, mounting a volume to the virtual machine may include providing an access path and mount point for the volume to the virtual machine, which may comprise an internet protocol (IP) address, a directory name, a file name, or any other path information to access the contents of the particular volume. Once mounted, the contents of the volume may be overlaid within the virtual machine to make the application executable. This overlaying may include modifying registry keys to make the application executable from the attached volume, as well as modifying the file system view to make the application appear as though it has been locally installed. For example, when an application storage volume is attached to a virtual machine, the files and directories for the application may appear in the "C:\Program Files" directory, although the executable file components remain stored in the attached volume.

In some implementations, administrators may manage and perform installation processes to store the applications in the application volumes. These installation processes may extract the necessary files and registry keys from an installer, and store the files and registry key files to an appropriate application storage volume. In some examples, the administrator may define application stacks, or groups of applications that are commonly assigned, and provide these groups of applications in one or more application volumes. For example, a first application stack may include productivity applications to be supplied to a first set of end users, and a second application stack may include video and image editing software to be provided to a second set of end users. Once the applications are stored within the application volumes, the administrator may define which of the applications or volumes are associated with requesting end users.

Here, in addition to managing the applications and volumes that should be attached for each of the users, administrators of a virtual computing service may also generate and manage firewall rules that can be implemented at the local virtual network interfaces cards (VNICs) for the virtual machines provided by the service. In particular, these rules may be used to permit and block communications to and from the virtual machines based on the current applications attached and made available on the virtual machine. For example, when a user requests a virtual session using the virtual computing service, the virtual computing service may allocate a virtual machine to the user and initiate an operation to attach one or more application volumes to the virtual machine to make applications associated with the user available for execution. In addition, a VNIC associated with the allocated virtual machine may be configured with firewall rules such that only administrator approved communications can be communicated for the virtual machine. Accordingly, if an application allocated to the user of the virtual machine initiated a communication, the VNIC may check the firewall rules and determine if the communication should be forwarded to the destination address. If the communication is to be forwarded, the VNIC may forward the outbound traffic toward the destination network address, otherwise, if the communication is not permitted based on the firewall rules, the VNIC may block the outgoing communication.

Although described herein as enforcing the firewall rule at the VNIC for the virtual machine, it is also possible to enforce the firewall rule at any location along the data path from the virtual machine to the physical NIC that connects the VM to the outside world. For example, the firewall rule may be enforced at the virtual switch that connects each VM's VNIC to a physical network interface connected to the other physical computing systems. In one embodiment, each VNIC connects to the virtual switch at a virtual port of the virtual switch, which includes a firewall enforcement component that receives the firewall rules and enforces the received rules.

To define the rules, the administrator may generate a new rule and associate the rule with an application available for attachment to a virtual machine. The rule may include a list of one or more ports that can be used to communicate for the application, an external communication address for the application, and an action to be taken if a communication matches a port and the external communication address. For example, a rule for a file-syncing application may define Transmission Control Protocol (TCP) ports 17500 and 17600 to be used with an application, provide a Uniform Resource Locator (URL) or internet protocol (IP) address to be used as the external address, and define a rule that permits communications that matches the port and external address requirements of the rule. Once defined, the rule may be supplied to VNICs operating on hypervisors for the virtual machines to be implemented based on the applications attached to the individual virtual machines.

FIG. 1 illustrates a computing environment 100 to implement application based network traffic management according to an implementation. Computing environment 100 includes virtual computing service 150, hosts 110-111, and data storage for application volumes 160. Hosts 110-111 execute hypervisors 130-131, which provide a platform for virtual machines 120-125. In particular, hypervisors 130-131 abstract the physical components of hosts 110-111 and provide virtual representations of hardware to the virtual machines, including processing systems, storage interfaces, network interfaces (VNICs 140-145), or other similar abstracted components.

In operation, end users, via end user devices, may transfer a virtual computing session request to virtual computing service 150. In response to the request, virtual computing service 150 will identify a virtual machine in virtual machines 120-125 to available for the virtual computing session, and provide the user with a remote session to the virtual machine. In addition to providing the user with a virtual machine, virtual computing service 150 may also maintain one or more data structures capable of determining applications that are required or associated with the requesting end user. For example, a first user may be associated with a first set of applications, while a second user may be associated with a second, different, set of applications. Once the applications are identified for a user, the applications may be attached to the virtual machine associated with that user via application volumes 160, wherein application volumes 160 store applications available to users of virtual computing service 150. This process of attaching may include mounting application volumes with the required applications to the virtual machine, and overlay contents of the volumes to make the one or more applications executable by the virtual machine.

As virtual machines are allocated applications, hypervisors 130-131 and their associated VNICs 140-145 determine firewall configurations to enhance security for the operations of the virtual machines. To determine the firewall configurations, the VNICs may obtain or identify the one or more applications that are made available on the associated virtual machine via attached application volumes. Once identified, firewall rules may be identified that correspond to the one or more applications, and the firewall rules may be implemented by the VNIC for inbound and outbound communications of the virtual machine. In at least one implementation, an administrator for computing environment 100 may define the firewall rules that correspond to each attached application, and may distribute the rules to the hypervisors within the environment. The hypervisors and VNICs may then dynamically implement required rules based on the applications that are allocated to the virtual machine. Accordingly, when a first set of applications is allocated to a virtual machine, such as virtual machine 120, then a first set of firewall rules will be implemented. Once the first set of applications are detached (often when a user logs off of the virtual machine or out of the service), then a second set of applications may be allocated to the virtual machine 120 and a second set of firewall rules will be implemented.

Figure 2:
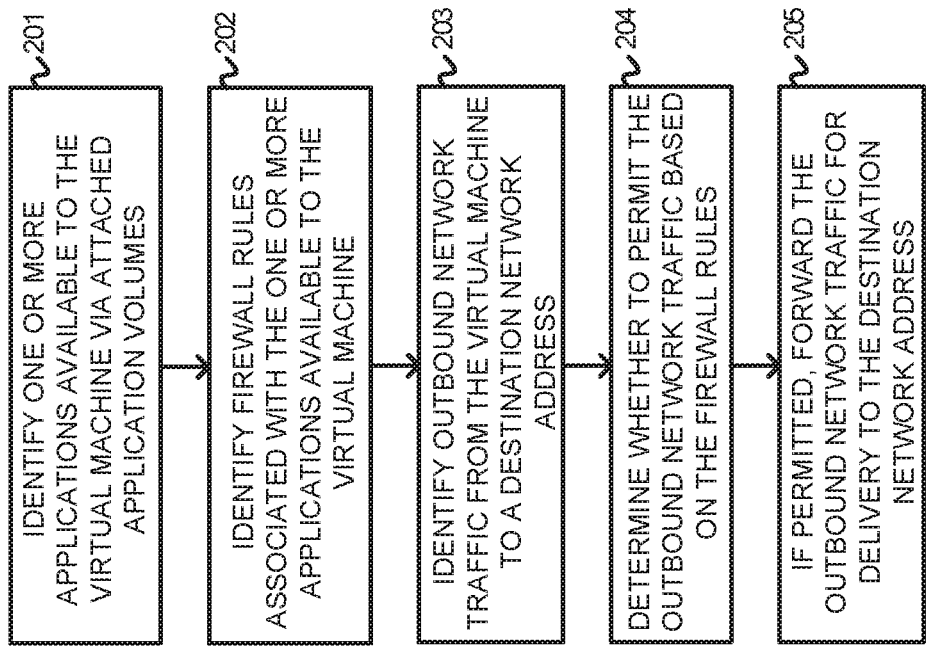
FIG. 2 illustrates an operation of implementing a firewall for a virtual machine according to an implementation.

To further demonstrate the operations of computing environment 100, FIG. 2 is provided. FIG. 2 illustrates an operation 200 of implementing a firewall for a virtual machine according to an implementation. The operations of FIG. 2 are referenced parenthetically in the paragraphs that follow, along with references to the elements and systems from computing environment 100 of FIG. 1. In the particular example of FIG. 2, the operations are described with respect to configuring VNIC 140, however, it should be understood that similar operations may be applied for any VNIC in VNICs 140-145 of FIG. 1.

As depicted, the method of FIG. 2 includes identifying (201) one or more applications available to virtual machine 120 via attached application volumes. These application volumes may be attached from application volumes 160 based on a user allocated to virtual machine 120. For example, if a user required productivity applications, virtual computing service 150 may initiate an attach process to attach one or more application volumes from application volumes 160 that store the required elements for the productivity applications. To determine which applications are made available via the attach volumes, virtual computing service 150 may provide identifiers to hypervisor 130 indicating the applications that will be made available to virtual machine 120. In some implementations, these identifiers may be provided by virtual computing service 150 when new applications are attached to the virtual machine. In some implementations, in addition to or in place of virtual computing service 150 automatically providing the identifiers, hypervisor 150 may request at defined intervals an update of the applications that are available via attached volumes.

Once the one or more applications are identified, the method further provides for identifying (202) firewall rules associated with the one or more applications available to virtual machine 120. In some implementations, the firewall rules may be provided from virtual computing service 150 with the indication of the applications available to virtual machine 120. Accordingly, when applications are to be attached to virtual machine 120, a notification may be transferred by virtual computing service 150 indicating the applications and the firewall rules that correspond to the applications. In alternate embodiments, firewall rules for the specified applications may be fetched from a separate controller or controller cluster (not shown) that is responsible for managing the network configurations. An example might be a software defined network (SDN) controller such as VMware NSX®. In other implementations, a database of firewall rules may be accessed and/or maintained at hypervisor 130, wherein the database may be used to employ firewall rules based on an indication from virtual computing service 150 regarding the applications to be attached to virtual machine 120. This database may be updated directly at the host computing system, or may be updated using the virtual computing service or other external controller or manager entity.

After the firewall rules are determined, the method further identifies (203) outbound network traffic from virtual machine 140 to a destination network address. In response to the request, VNIC 140 may determine (204) whether to permit the outbound network traffic based on the firewall rules and, if permitted, forward (205) the outbound network traffic for delivery to the destination network address. To provide these operations, VNIC 140 may, after the firewall rules are identified, monitor the data traffic to and from virtual machine 140. Accordingly, when a packet is communicated, VNIC 140 may extract attribute information for the packet to determine whether the port (associated with the service) on the virtual machine and the network address of the external service correspond to a firewall rule. If they correspond to a firewall rule, VNIC 140 may apply the corresponding firewall action. In contrast, if the external service or the port for the virtual machine do not match a firewall rule for an attached application, then VNIC 140 may block the communication from being forwarded. While demonstrated in the previous example as identifying a port and an external address associated with a communication, it should be understood that other information may be identified from the packet to apply the firewall rules. This information may include the size of the packet, the application of origin, or any other similar information about the packet.

Although described in the example of FIG. 2 as monitoring the outbound network traffic from virtual machine 120, it should also be understood that similar operations may be provided for inbound network traffic to virtual machine 120. For example, when inbound network traffic is identified for virtual machine 120, VNIC 140 may extract attribute information for the communication and compare the information with the firewall rules to determine if the communication is permitted. If permitted, VNIC 140 may forward the communication to virtual machine 120. In contrast, if the communication is not permitted, such as if the communication was from an unknown external network address, then VNIC 140 may prevent the communication from being forwarded to virtual machine 120.

Figure 3:
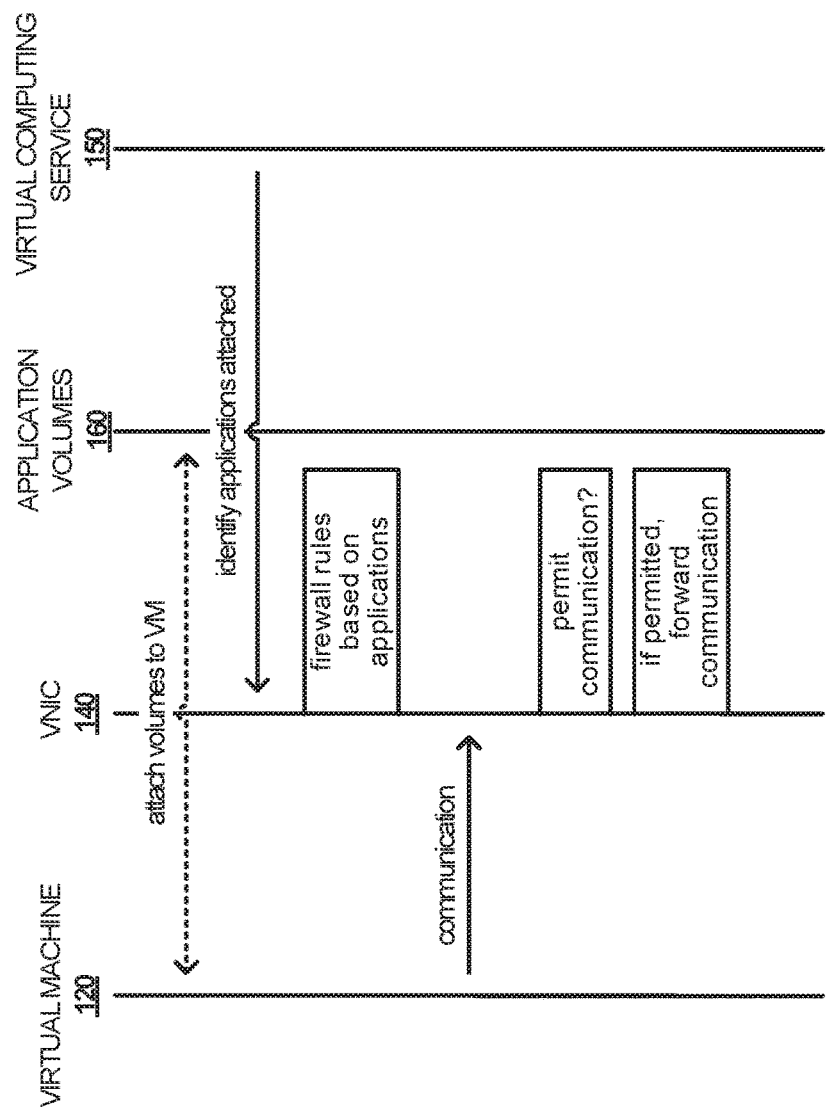
FIG. 3 illustrates a timing diagram of managing outbound traffic from a virtual machine according to an implementation.

FIG. 3 illustrates a timing diagram 300 of managing outbound traffic from a virtual machine according to an implementation. Timing diagram 300 is described in the paragraphs that follow with references to the elements and systems from computing environment 100 of FIG. 1. In particular, the example of timing diagram 300 includes virtual machine 120, VNIC 140, application volumes 160, and virtual computing service 150. Although illustrated using virtual machine 120, it should be understood that similar operations may apply to any virtual machine in computing environment 100.

As depicted in timing diagram 300, application volumes are attached from application volumes 160 to virtual machine 120. In some implementations, these application volumes are associated with a particular user of virtual computing service 150. Accordingly, to supply the user with the required virtual session, applications may be made available by mounting volumes with the required applications and overlaying contents of the volumes in the virtual machine to make the applications executable by the virtual machine. As the applications are attached, virtual computing service 150 may provide VNIC 140 (or other hypervisor component) with identifiers for applications that are attached to virtual machine 120. For example, if a user were allocated virtual machine 120 and required the use of productivity applications, virtual computing service 150 may provide a list of the productivity applications that are made available via the application volumes to virtual machine 120. Based on the list of applications provided from virtual computing service 150, VNIC 140 (or the other hypervisor component) may identify and employ firewall rules for communications by virtual machine 120. As described previously, in some implementations, hypervisor 130 and/or VNIC 140 may maintain one or more data structures that manage available firewall rules to be applied for the virtual machine or obtain the same from an external controller or common storage database or file. Consequently, when the list of applications is provided from virtual computing service 150, VNIC 140 may identify the firewall rules for the virtual machine based on the list.

Once the rules are determined, VNIC 140 may identify a communication from virtual machine 120. In response to identifying the communication, VNIC 140 may extract information about the communication, and use the extracted information to determine whether to permit the communication. If the communication is permitted, then the communication may be forwarded to the external network address, however, if the communication is not permitted, then VNIC 140 may prevent the forwarding of the communication. In some examples, the extracted communication information may include a source or destination port for virtual machine 120 and a destination network address for the communication. This information may then be compared to the firewall rules to determine whether a firewall rule applies to the communication. Other examples of information from a communication may include, but are not limited to, the size of the communication or the application (executable) source of the communication.

In some implementations, the firewall rules may define the approved communications for the virtual machine. As a result, only communications for approved applications may be permitted by VNIC 140. For example, when an outbound network communication is identified, VNIC 140 may determine whether the communication corresponds to an approved application. If the communication corresponds to an approved application, then the communication will be forwarded to the destination network address, however, if a firewall rule cannot be identified for the communication, then the communication may be blocked.

Figure 4:
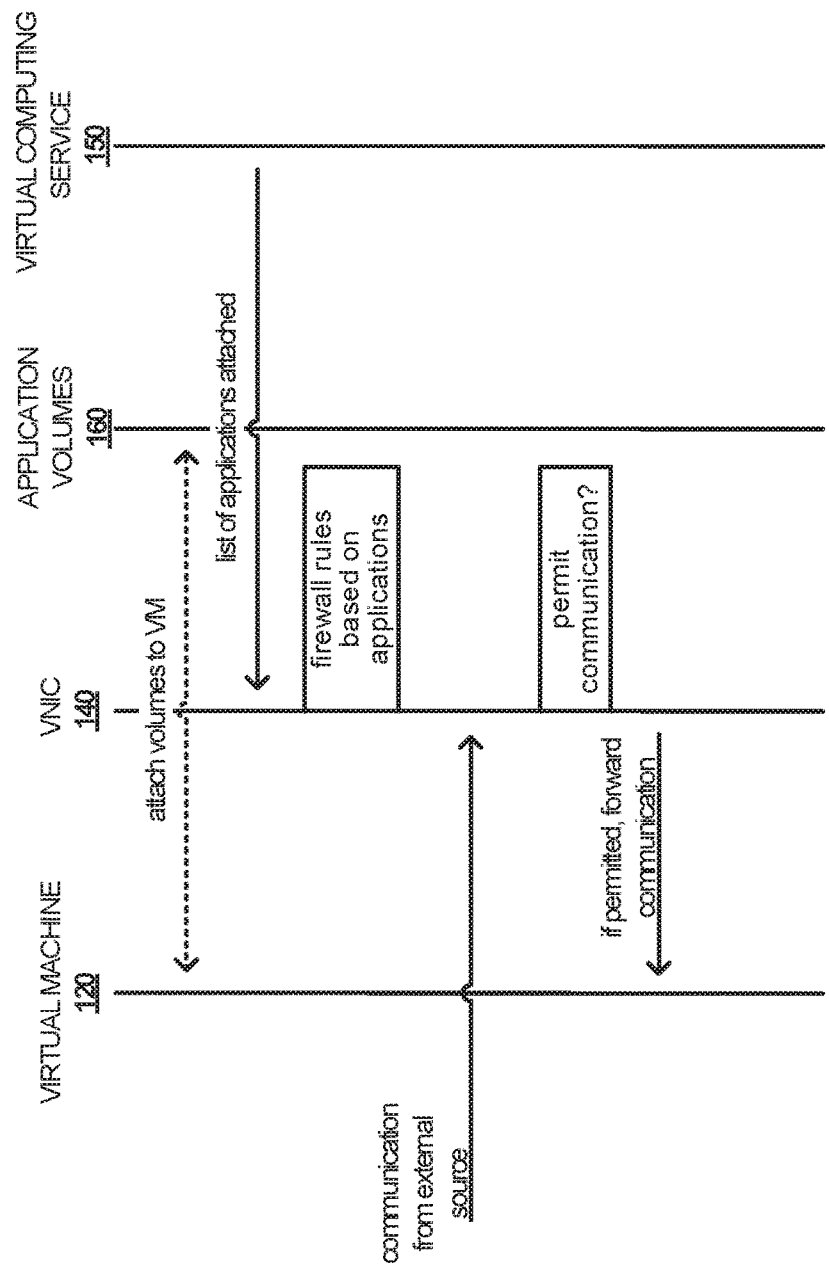
FIG. 4 illustrates a timing diagram of managing inbound traffic for a virtual machine according to an implementation.

FIG. 4 illustrates a timing diagram 400 of managing inbound traffic for a virtual machine according to an implementation. Timing diagram 400 is described in the paragraphs that follow with references to the elements and systems from computing environment 100 of FIG. 1. In particular, the example of timing diagram 400 includes virtual machine 120, VNIC 140, application volumes 160, and virtual computing service 150. Although illustrated using virtual machine 120, it should be understood that similar operations may apply to any virtual machine in computing environment 100.

Similar to the operations provided in timing diagram 300 of FIG. 3, timing diagram 400 begins by the attachment of one or more application volumes from application volumes 160 to virtual machine 120. This attachment of the volumes permits one or more applications stored thereon to be made executable on virtual machine 120. In particular, in attaching the application volumes, the application volumes may be mounted to virtual machine 120, and the contents of the volumes may be overlaid in the virtual machine to make the application executable from the attached volumes. For example, registry information for the applications may be overlaid within the virtual machine, and files and directories for the application may appear in the "C:\Program Files" directory, although the executable file components remain stored in the attached volume.

In addition to attaching the application volumes, which may be attached based on a user assigned to the virtual machine, virtual computing service 150 may provide VNIC 140 and/or the associated hypervisor with application identifiers for applications that are attached to virtual machine 120. For example, if a user were allocated virtual machine 120 and required the use of productivity applications, virtual computing service 150 may provide a list of the productivity applications that are made available via the application volumes to virtual machine 120. Based on the list of applications provided from virtual computing service 150, VNIC 140 may identify and employ firewall rules for communications by virtual machine 120. As described previously, in some implementations, hypervisor 130, which manages VNIC 140, may maintain one or more data structures that administer available firewall rules to be applied for the virtual machine, or hypervisor 130 may obtain the firewall rules to be applied from an external controller or a common storage location. Consequently, when the list of applications is provided from virtual computing service 150, VNIC 140 or other hypervisor component may identify the firewall rules for the virtual machine based on the list. In other implementations, in supplying the list of applications virtual computing service 150 may also supply the firewall rules for the applications, such that data structures are not required to be maintained locally at each of the hosts.

Once the rules are determined, VNIC 140 may identify a communication from an external source directed at virtual machine 120. In response to identifying the communication, VNIC 140 may extract attribute information for the communication, and use the attribute information to determine whether to permit the communication. If the communication is permitted, then the communication may be forwarded to the virtual machine, however, if the communication is not permitted, then VNIC 140 may prevent the forwarding of the communication to the virtual machine. In some examples, the extracted attribute information may include a port or service for virtual machine 120 and a source network address for the communication. This information may then be compared to the firewall rules to determine whether a firewall rule applies to the communication.

In some implementations, the firewall rules may define the approved communication sources and destinations for the virtual machine. As a result, only communications for approved applications may be permitted by VNIC 140. For example, when an inbound network communication is identified, VNIC 140 may determine whether the communication corresponds to an approved application. If the communication corresponds to an approved application, then the communication will be forwarded to the virtual machine, however, if a firewall rule cannot be identified for the communication, then the communication may be blocked and prevented from being forwarded to the virtual machine.

FIG. 5 illustrates a data structure 500 to manage firewall rules according to an implementation. Data structure 500 is an example data structure for applying firewall rules for a VNIC, however, it should be understood that the hypervisor and/or the VNIC may maintain a separate data structure with all available applications capable of being attached to virtual machines in the computing environment. Data structure 500 comprises a table with columns for application identifiers (IDs) 510, sources 520, destinations 530, and actions 540. Although illustrated in the example of FIG. 5 as a single table, it should be understood that one or more tables, linked lists, arrays, data trees, or other similar data structures may be used to manage the firewall rules. Further, while demonstrated in the example of data structure 500 with four columns, it should be understood that any number of columns may be used to manage communications for the virtual machine. For example, rather than apply rules based only on source or destination addresses, the rule may apply to specific protocols, specific port number or ranges for protocols that support port identifiers, specific days of the week, times of day, etc. In one embodiment, the firewall rules associated with particular applications are defined by an administrator, either directly by editing a configuration file, updating a database, or accessing a management server for specifying firewall rule configurations.

In operation, when application volumes are attached to a virtual machine, a hypervisor, which provides a VNIC to the virtual machine, may be required to identify the applications that are made available via the application volumes. To determine the available applications, a virtual computing service, which allocates virtual machines to end users, may automatically provide identifiers for the applications that are being attached to a virtual machine, or may provide identifiers for the applications in response to a request from the hypervisor for the virtual machine. Once the application identifiers are provided, the VNIC for the virtual machine may be configured with firewall rules to manage the incoming and outgoing data communications for the virtual machine. In some implementations, the rules may be maintained locally on the host computing system for the virtual machine. These rules may be input directly to the host computing system, or may be provided via the virtual computing service that can distribute rules to any number of hosts in the computing environment. In other implementations, as part of providing the identifiers for the application, the virtual computing service may provide the rules as applications are made available via the attached volumes. In the present example, firewall rules are identified for applications A-D 540-543, which are made available to a virtual machine via attached volumes. Although only one rule for each application A-D is shown, each application identifier may be associated with any number of firewall rules.

Once the rules are identified for the VNIC associated with the virtual machine, the rules may be used to manage network traffic for the virtual machine. For example, in an outbound communication request for the virtual machine, the VNIC may extract attributes for the communication, and determine if the attributes correspond to one of the rules for applications A-D 540-543. In the particular example of data structure 500, the VNIC may determine the application associated with the communication (.exe), the source of the communication (port of the virtual machine that corresponds to a particular service), and the destination (IP address or domain) for the communication. Once determined the information may be applied to columns for application identifiers 510, sources 520, and destinations 530 to determine whether a rule corresponds to the communication. If a rule corresponds, then the action from actions 540 may be applied for the communication. These actions may define whether a communication is permitted, blocked, or some other similar determination.

In some implementations, the firewall rules may be used to expressly permit or block specific communications. For example, the actions in actions 540 may comprise permit actions to only permit communications for applications currently made available via attached volumes. Thus, if a communication does not match the traits for a permitted application in applications A-D 540, then the communication may be blocked, and in some examples reported to an administrator of the computing environment. However, if the communication does match a rule for an available application, then the communication may be forwarded toward the desired destination.

In many examples, the firewall rules implemented by the VNICs for the virtual machines may be dynamically modified based on the current user assigned to the virtual machine. For example, a first set of rules, such as those illustrated in data structure 500 may be provided for a first user, however, when the user logs off of the virtual machine, the virtual machine may be assigned to a second user. Once assigned to the second user, new application volumes may be attached to the virtual machine, and corresponding firewall rules may be provided to the associated VNIC. Further, in some implementations, a user may be dynamically allocated a new application volume with one or more applications while the user is allocated a virtual machine. Consequently, the firewall rules for the virtual machine may be updated to reflect the newly available applications. This update may be passed automatically from the virtual computing service, or may be provided based on a request from the hypervisor to the virtual computing service.

Although described in the example of FIG. 5 as implementing the firewall rules in a VNIC for a virtual machine, it should be understood that the firewall rules may be implemented at any point in the data path for the virtual machine on the host computing system. For example, a virtual switch that provides port to the VNIC may be used to implement the firewall rules for the virtual machines on a host computing system.

Figure 6:
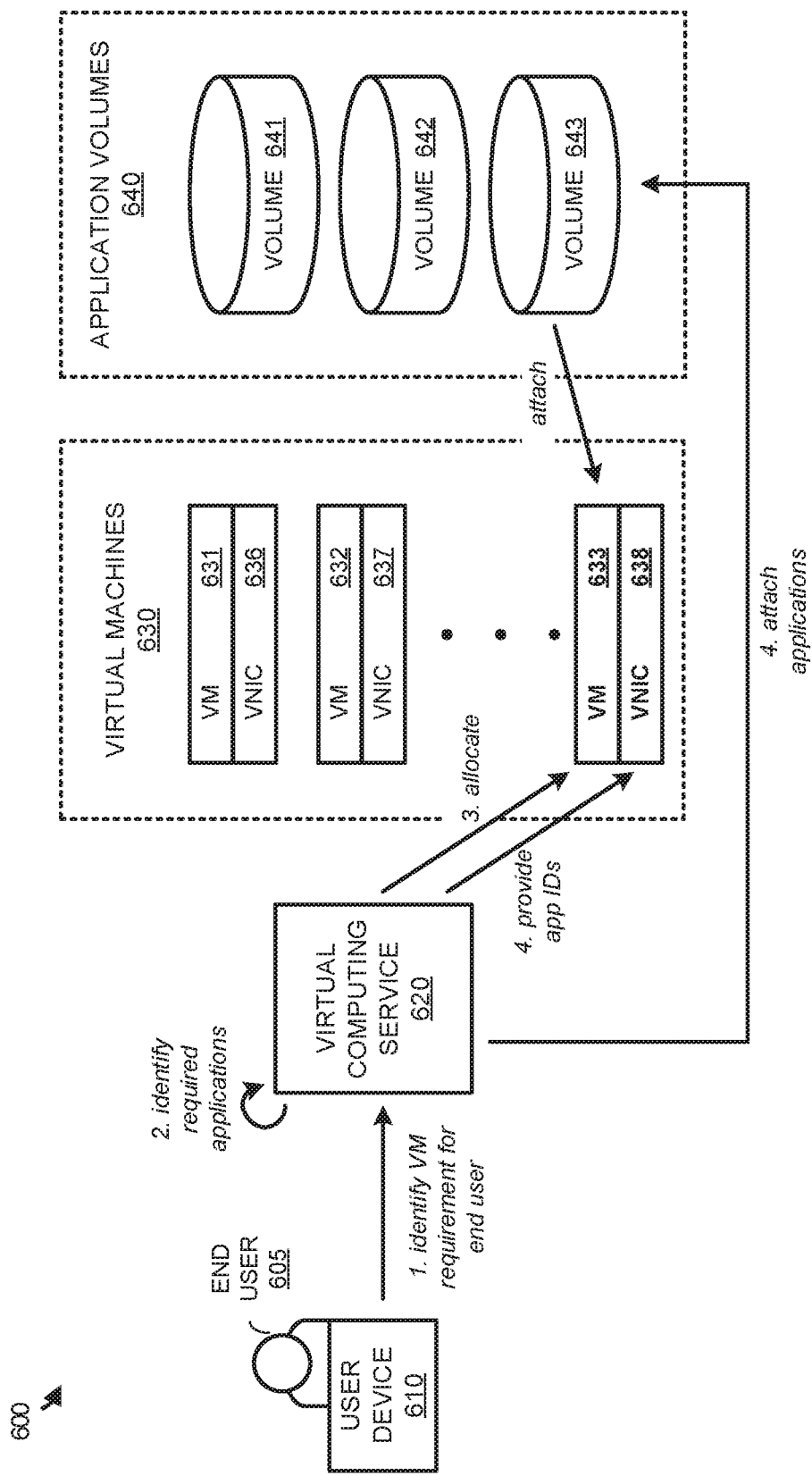
FIG. 6 illustrates an operational scenario of providing firewall rules for a virtual machine according to an implementation.

FIG. 6 illustrates an operational scenario 600 of providing firewall rules for a virtual machine according to an implementation. Operational scenario 600 includes end user 605 operating user device 610, virtual computing service 620, virtual machines 630, and application volumes 640. Virtual machines 630 include virtual machines (VMs) 631-333, which are each associated with VNICs 636-638. Application volumes 640 includes volumes 641-643, which may comprise VMDKs, VHDs, or some other virtual disk file capable of storing applications for execution by VMs 631-633. Although illustrated with three virtual machines in the present implementation, it should be understood that any number of virtual machines may be supported by virtual computing service 620.

In operation, virtual computing service 620 identifies, at step 1, a virtual machine requirement for end user 605. This requirement may be identified based on end user 605 logging into virtual computing service using an application or web browser on user device 610, may be identified based on a schedule predicting the requirement of a virtual machine for end user 605, or may be identified in any other similar manner. In response to identifying the virtual machine requirement for end user 605, virtual computing service 620, at step 2, identifies required applications for end user 605. In at least one implementation, to identify the required applications, virtual computing service 620 may include one or more data structures capable of associating end users with required applications. For example, if end user 605 requested a virtual session, the user may be required to provide credentials, such as a username, password, or some other similar credential. Based on the credentials, virtual computing service 620 may determine the applications associated with the user, as well as the application volumes that support the applications.

In addition to identifying the application, virtual computing service 620 may also allocate, at step 3, a virtual machine to provide the virtual session to end user 605. This allocation may include identifying a virtual machine that is idle and not currently allocated to another user of the service, initiating a startup or some other operation to make a new virtual machine available for the end user, or some other similar allocation operation. Once allocated, the user may be provided with a remote virtual session to the allocated virtual machine, in the present example virtual machine 633. Although illustrated as allocating a virtual machine after identifying the required applications for the user, it should be understood that these operations may occur concurrently or in reverse order in some implementations.

Once the applications are identified along with the corresponding application volumes, virtual computing service 620 may initiate, at step 4, an attach process to make the applications available on virtual machine 633. The attach operation may include mounting, by a hypervisor or some platform element, the required application volumes, in the present example volume 643, and overlaying contents of volume 643 to make the application executable from volume 643. This overlaying may include overlaying registry keys in the virtual machine, as well as making the files associated with the application appear within a file system view for the virtual machine.

Here, in addition to initiating the attach operations for application volume 643, virtual computing service 620 further provides, at step 4, application identifiers for VNIC 638 to implement firewall rules associated with the applications attached to virtual machine 633. In some examples, the identifiers may be provided automatically by virtual computing service 620 when the application volumes are attached to the virtual machine. In other implementations, VNIC 638, or the hypervisor responsible for managing VNIC 638, may transfer requests at intervals to retrieve identifiers for the applications made available via the attached storage volumes. Once the application identifiers are obtained, VNIC 638 may implement firewall rules associated with the applications to manage network traffic to and from the virtual machine. This managing of network traffic may permit VNIC 638 to identify sources of communications, destinations of communications, and other similar attributes of communications, and use the attributes to determine whether to forward or block the communication.

While demonstrated in the example of FIG. 6 as initiating the attachment process for applications to the virtual machine and providing application identifiers at the same instance, it should be understood that these operations may not occur simultaneously. In particular, the application identifiers may be provided before or after initiating the attachment of the applications. For example, if virtual computing service 620 may hold in providing the application identifiers until the attach operation is complete and the applications within the application volumes are ready for execution.

In some implementations, as applications are added to a computing environment via new application volumes, an administrator of the environment may also generate one or more firewall rules. These rules may include source addresses for communications, destination addresses for communications, and any other similar information that can be extracted from a communication. Additionally, the rules may define actions to be taken against the particular communications, wherein the actions may include approval actions to forward the communication, block actions to block the communication, or any other similar firewall action. In some implementations, the rules may be defined locally at each host of the computing environment, and made available to each virtual machine of the host based on the attached applications. In other implementations, the rules may be defined by virtual computing service 620 and distributed to each of the hosts as the rules are defined. Once forwarded, the hosts and hypervisors may manage the various rules, and implement the rules for each of the VNICs as required for the various applications. In further implementations, rather than storing a cache of the rules at the hosts of the computing environment, the rules may be provided by virtual computing service 620 as part of the list of applications that are to be attached to a particular virtual machine.

Although not illustrated in the example of operational scenario 600, it should be understood that the allocation of applications and firewall rules to a particular virtual machine is dynamic. In particular, when end user 605 logs out of the virtual machine or terminates the virtual session using virtual machine 633, the application volume 643 attached to virtual machine 633 may be detached from the virtual machine, preventing future execution of the applications from application volume 643. Similarly, the firewall rules associated with the application may be made inactive with VNIC 638. In some implementations, a notification may be transferred from virtual computing service 620 to detach the applications and make the firewall rules inactive for VNIC 638. However, in other implementations, virtual machine 633 may identify the termination of the virtual session with end user 605, and initiate operations to detach the applications and make the firewall rules inactive. Once the applications are detached and the firewall rules made inactive, virtual computing service 620 may allocate a new end user to the virtual machine. Responsive to the allocations, one or more applications may be attached to the virtual machine that are associated with the end user, and firewall rules for VNIC 638 may be updated to correspond to the applications.

While demonstrated in the example of FIG. 6 as enforcing the firewall at the VNIC for the virtual machine, it should be understood that the firewall may be enforced at any location along the data path between the virtual machine and the physical network interface of the host computing system that connects the virtual machine to other computing systems. For example, the firewall rules may be enforced at the virtual switch (which may operate as part of the hypervisor for the virtual machine). In at least one implementation, each VNIC connects to the virtual switch at a virtual port of the virtual switch, wherein the virtual switch may be configured to provide the firewall operations described herein.

Figure 7:
FIG. 7 illustrates a data structure to manage applications associated with end users of a virtual computing service according to an implementation.

FIG. 7 illustrates a data structure 700 to manage applications associated with end users of a virtual computing service according to an implementation. Data structure 700 is an example data structure that can be used by a virtual computing service to attach applications to virtual machines. Data structure 700 includes columns for user identifiers (IDS) 710 for users A-D 740-743 and applications 720-722. Although illustrated as a single table in the present implementation, it should be understood that any number of tables, linked lists, data trees, arrays, or other similar data structures may be used in managing the applications for end users of the service.

As described herein, end users may log into a virtual computing service to obtain a desktop session via a virtual machine. To supply the user with the desktop session, the virtual computing service may allocate a virtual machine for the end user and initiate an attach process to attach one or more applications to the virtual machine, wherein the attach process may include mounting application volumes to the virtual machine and overlaying the contents of the volume in the virtual machine. This overlaying may include modifying registry information for the virtual machine to make the applications executable from the mounted volume.

Here, to determine the applications to be attached to the virtual machine, data structure 700 is provided, wherein the virtual computing service may use data structure 700 to determine which applications should be attached for which user. For example, if user A 740 transferred a request for a virtual computing session, the virtual computing service may allocate a virtual machine to the user and determine applications to be attached using application columns 720-722. Based on the information in the columns, one or more application volumes may be mounted to the allocated virtual machine that store the required applications. Once mounted the contents of the volumes may be overlaid, and the user may execute the applications once the login process is complete for the user to the virtual machine.

In addition to being used for the attachment of applications to the virtual machines, data structure 700 is further used to provide application identifier information to the hypervisor and VNIC associated with the allocated virtual machine. Returning to the example of user A 740, data structure 700 may be used to provide application identifiers for the applications associated with user A 740 to the hypervisor for the allocated virtual machine. In some implementations, the application identifiers may be provided automatically when applications are attached to a virtual machine. In some implementations, in addition to or in place of the automatic providing of the applications, the VNIC or other hypervisor component may request at various intervals updates regarding the applications that are attached to the virtual machine. In response to the requests, the virtual computing service may provide identifiers for the applications that are attached to the virtual machine, wherein the VNIC may implement firewall rules based on the identifiers.

Figure 8:
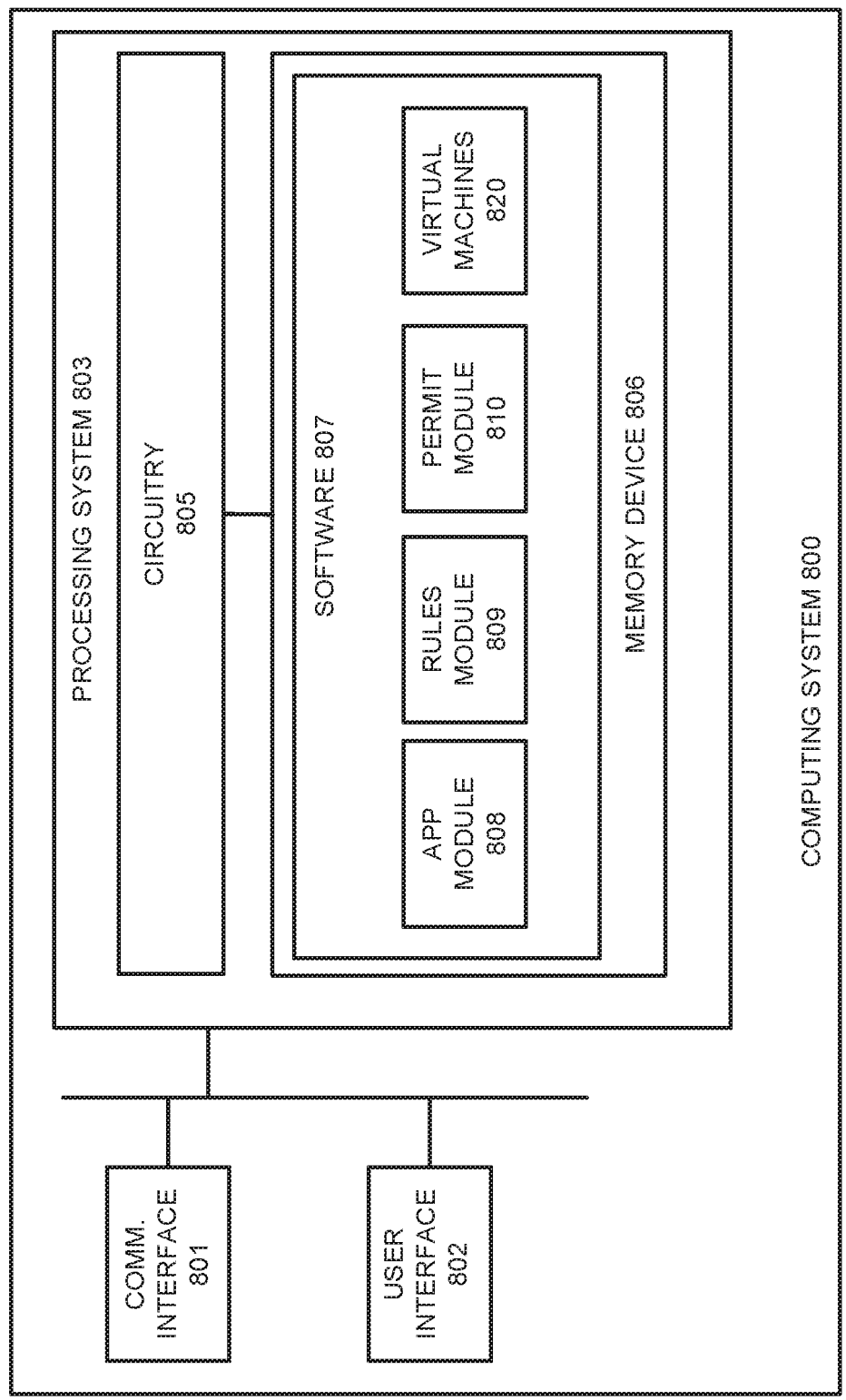
FIG. 8 illustrates a computing system to implement application based network traffic management according to an implementation.

FIG. 8 illustrates a computing system 800 to implement application based network traffic management according to an implementation. Computing system 800 is representative of any computing system or systems with which the various operational architectures, processes, scenarios, and sequences disclosed herein for a host system can be implemented. Computing system 800 is an example of hosts 110-111, although other examples may exist. Computing system 800 comprises communication interface 801, user interface 802, and processing system 803. Processing system 803 is linked to communication interface 801 and user interface 802. Processing system 803 includes processing circuitry 805 and memory device 806 that stores operating software 807. Computing system 800 may include other well-known components such as a battery and enclosure that are not shown for clarity.

Communication interface 801 comprises components that communicate over communication links, such as network cards, ports, radio frequency (RF), processing circuitry and software, or some other communication devices. Communication interface 801 may be configured to communicate over metallic, wireless, or optical links. Communication interface 801 may be configured to use Time Division Multiplex (TDM), Internet Protocol (IP), Ethernet, optical networking, wireless protocols, communication signaling, or some other communication format—including combinations thereof. In at least one implementation, communication interface 801 may be used to communicate with a virtual computing service to obtain information about applications attached to a virtual machine on computing system 800.

User interface 802 comprises components that interact with a user to receive user inputs and to present media and/or information. User interface 802 may include a speaker, microphone, buttons, lights, display screen, touch screen, touch pad, scroll wheel, communication port, or some other user input/output apparatus—including combinations thereof. User interface 802 may be omitted in some examples.

Processing circuitry 805 comprises microprocessor and other circuitry that retrieves and executes operating software 807 from memory device 806. Memory device 806 may include volatile and nonvolatile, removable and non-removable media implemented in any method or technology for storage of information, such as computer readable instructions, data structures, program modules, or other data. Memory device 806 may be implemented as a single storage device, but may also be implemented across multiple storage devices or sub-systems. Memory device 806 may comprise additional elements, such as a controller to read operating software 807. Examples of storage media include random access memory, read only memory, magnetic disks, optical disks, and flash memory, as well as any combination or variation thereof, or any other type of storage media. In some implementations, the storage media may be a non-transitory storage media. In some instances, at least a portion of the storage media may be transitory. It should be understood that in no case is the storage media a propagated signal.

Processing circuitry 805 is typically mounted on a circuit board that may also hold memory device 806 and portions of communication interface 801 and user interface 802. Operating software 807 comprises computer programs, firmware, or some other form of machine-readable program instructions. Operating software 807 includes application (app) module 808, rules module 809, permit module 810, and virtual machines 820, although any number of software modules may provide a similar operation. Operating software 807 may further include an operating system, utilities, drivers, network interfaces, applications, or some other type of software. When executed by processing circuitry 805, operating software 807 directs processing system 803 to operate computing system 800 as described herein.

In operation, end users may be allocated virtual machines in virtual machines 820. When the virtual machine is allocated, one or more applications may be made available to the virtual machine via one or more application volumes. In particular, the application volumes may be mounted, and the contents of the applications volumes may be overlaid in the virtual machine to make the applications executable. In addition to attaching volumes to the allocated virtual machine, application module 808 may direct processing system 803 to identify one or more applications available for execution on the allocated virtual machine from one or more mounted application volumes. In some implementations, to identify the applications, application identifiers may be provided from the virtual computing service responsible for allocating the virtual machine.

Once the applications are identified, rules module 809 directs processing system 803 to identify firewall rules for the one or more applications. In some examples, the firewall rules may be stored in one or more data structures on computing system 800, wherein the data structures may be updated by an administrator locally at computing system 800 or distributed from the virtual computing service or some other controller system. These rules may be used to permit or deny incoming and outgoing communications based on the service associated with the communication, the destination of a communication, or some other similar trait of the communication. In some examples, the rules may be used to limit network traffic of the virtual machine to applications that are identified to be attached to the virtual machine.

After determining the firewall rules, permit module 810 directs processing system 803 to identify network traffic to or from the virtual machine, determine whether to permit the network traffic based on the firewall rules, and forward the network traffic based on whether the network traffic is permitted. For example, for an outbound network communication to a destination network address, permit module 810 may extract information from the communication to determine whether the communication is permitted, and forward the communication toward the destination address if the communication is permitted.

Returning to the elements of FIG. 1, virtual computing service 150 may comprise communication interfaces, network interfaces, processing systems, computer systems, microprocessors, storage systems, storage media, or some other processing devices or software systems, and can be distributed among multiple devices. Examples of virtual computing service 150 can include software such as an operating system, logs, databases, utilities, drivers, natural language processing software, networking software, and other software stored on a computer-readable medium. Virtual computing service 150 may comprise, in some examples, one or more server computing systems, desktop computing systems, laptop computing systems, or any other computing system, including combinations thereof.

Hosts 110-111 may each comprise communication interfaces, network interfaces, processing systems, computer systems, microprocessors, storage systems, storage media, or some other processing devices or software systems, and can be distributed among multiple devices. Hosts 110-111 can each include software such as an operating system, logs, databases, utilities, drivers, natural language processing software, networking software, and other software stored on a computer-readable medium. Hosts 110-111 may each comprise a serving computing system, a desktop computing system, or some other similar computing system.

Application volumes 160 may reside on any computing system or systems that can include communication interfaces, network interfaces, processing systems, computer systems, microprocessors, storage systems, storage media, or some other processing devices or software systems, and can be distributed among multiple devices. Application volumes 160 may be located on one or more server computing systems, desktop computing systems, laptop computing systems, or any other computing system, including combinations thereof. Although illustrated separate from hosts 110-111, it should be understood that application volumes 160 may be stored locally on hosts 110-111 in some implementations.

Communication between virtual computing service 110, hosts 110-111, and application volumes 160 may use metal, glass, optical, air, space, or some other material as the transport media. Communication between virtual computing service 110, hosts 110-111, and application volumes 160 may use various communication protocols, such as Time Division Multiplex (TDM), asynchronous transfer mode (ATM), Internet Protocol (IP), Ethernet, synchronous optical networking (SONET), hybrid fiber-coax (HFC), circuit-switched, communication signaling, wireless communications, or some other communication format, including combinations, improvements, or variations thereof. Communication between virtual computing service 110, hosts 110-111, and application volumes 160 may be a direct link or can include intermediate networks, systems, or devices, and can include a logical network link transported over multiple physical links.

The included descriptions and figures depict specific implementations to teach those skilled in the art how to make and use the best mode. For the purpose of teaching inventive principles, some conventional aspects have been simplified or omitted. Those skilled in the art will appreciate variations from these implementations that fall within the scope of the invention. Those skilled in the art will also appreciate that the features described above can be combined in various ways to form multiple implementations. As a result, the invention is not limited to the specific implementations described above, but only by the claims and their equivalents.

What is claimed is:

1. A method of operating a host of a virtual machine to implement a firewall for the virtual machine, the method comprising:
    obtaining, from a virtual computing service, identifiers for one or more applications available for execution on the virtual machine, wherein the virtual computing service initiates a process to make the one or more applications executable on the virtual machine based on a user of the virtual machine;
    identifying firewall rules for the one or more applications;
    identifying outbound network traffic from the virtual machine;
    determining that the outbound network traffic is permitted based on the firewall rules; and
    in response to determining that the outbound network traffic is permitted, forwarding the outbound network traffic to a destination network address.

2. The method of claim 1, wherein the one or more applications are stored on one or more volumes mounted to the virtual machine.

3. The method of claim 1, wherein identifying the firewall rules for the one or more applications comprises accessing a database that stores a plurality of firewall rules for a plurality of applications to identify the firewall rules of the plurality of firewall rules associated with the one or more applications.

4. The method of claim 1, wherein obtaining the identifiers for the one or more applications from the virtual computing service comprises obtaining the identifiers for the one or more applications from the virtual computing service in response to the user requesting a virtual computing session from the virtual computing service.

5. The method of claim 1, wherein the one or more applications are associated with the user assigned to the virtual machine by the virtual computing service.

6. The method of claim 1, wherein the one or more applications are stored on one or more volumes mounted to the virtual machine, and wherein contents of the one or more volumes are overlaid in file system view of the virtual machine.

7. The method of claim 1 further comprising:
identifying inbound network traffic for the virtual machine;
determining that the inbound network traffic is permitted based on the firewall rules; and
in response to determining that the inbound network traffic is permitted, forwarding the inbound network traffic to the virtual machine.

8. The method of claim 1, wherein the firewall rules indicate approved ports for communication by the virtual machine.

9. The method of claim 1 further comprising:
identifying additional outbound network traffic from the virtual machine;
determining that the additional outbound network traffic is not permitted based on the firewall rules; and
in response to determining that the additional outbound network traffic is not permitted, blocking the additional outbound network traffic.

10. A host comprising:
one or more computer readable storage media;
a processing system operatively coupled to the one or more computer readable storage media; and
program instructions stored on the one or more computer readable storage media to implement firewall rules for a virtual machine that, when executed by the processing system, direct the processing system to:
obtain, from a virtual computing service, identifiers for one or more applications available for execution on the virtual machine, wherein the virtual computing service initiates a process to make the one or more applications executable on the virtual machine based on a user of the virtual machine;
identify firewall rules for the one or more applications;
identify outbound network traffic from the virtual machine;
determine that the outbound network traffic is permitted based on the firewall rules; and
in response to determining that the outbound network traffic is permitted, forward the outbound network traffic to a destination network address.

11. The host of claim 10, wherein the one or more applications are stored on one or more volumes mounted to the virtual machine.

12. The host of claim 10, wherein identifying the firewall rules for the one or more applications comprises accessing a database that stores a plurality of firewall rules for a plurality of applications to identify the firewall rules of the plurality of firewall rules associated with the one or more applications.

13. The host of claim 10, wherein obtaining the identifiers for the one or more applications from the virtual computing service comprises obtaining the identifiers for the one or more applications from the virtual computing service in response to the user requesting a virtual computing session from the virtual computing service.

14. The host of claim 10, wherein the one or more applications are associated with the user assigned to the virtual machine by the virtual computing service.

15. The host of claim 10, wherein the one or more applications are stored on one or more volumes mounted to the virtual machine, and wherein contents of the one or more volumes are overlaid in file system view of the virtual machine.

16. The host of claim 10, wherein the program instructions further direct the processing system to:
identify inbound network traffic for the virtual machine;
determine that the inbound network traffic is permitted based on the firewall rules; and
in response to determining that the inbound network traffic is permitted, forward the inbound network traffic to the virtual machine.

17. The host of claim 10, wherein the firewall rules indicate approved ports for communication by the virtual machine.

18. The host of claim 10, wherein the program instructions further direct the processing system to:
identifying additional outbound network traffic from the virtual machine;
determining that the additional outbound network traffic is not permitted based on the firewall rules; and
in response to determining that the additional outbound network traffic is not permitted, blocking the additional outbound network traffic.

19. A system comprising:
a virtual computing service; and
a host configured to:
obtain, from the virtual computing service, identifiers for one or more applications available for execution on the virtual machine, wherein the virtual computing service initiates a process to make the one or more applications executable on the virtual machine based on a user of the virtual machine;
identify firewall rules for the one or more applications;
identify outbound network traffic from the virtual machine;
determine that the outbound network traffic is permitted based on the firewall rules; and
in response to determining that the outbound network traffic is permitted, forward the outbound network traffic to a destination network address.

20. The system of claim 19, wherein the virtual computing service is further configured to:
in response to a request for a virtual computing session for an end user, allocate the virtual machine to the end user;
identify the one or more applications associated with the end user;
initiate the process to make the one or more applications executable on the virtual machine; and
transfer the identifiers for the one or more applications to the host.

* * * * *